US011619732B2

(12) United States Patent
Ney et al.

(10) Patent No.: US 11,619,732 B2
(45) Date of Patent: Apr. 4, 2023

(54) MOTION DETECTION AND RECOGNITION USING SEGMENTED PHASE AND AMPLITUDE DATA FROM REFLECTED SIGNAL TRANSMISSIONS

(71) Applicant: Apple Inc., Cupertino, CA (US)

(72) Inventors: Michael Ney, Beer Sheva (IL); Zohar Agon, Tel Aviv (IL)

(73) Assignee: Apple Inc., Cupertino, CA (US)

(*) Notice: Subject to any disclaimer, the term of this patent is extended or adjusted under 35 U.S.C. 154(b) by 180 days.

(21) Appl. No.: 16/893,898

(22) Filed: Jun. 5, 2020

(65) Prior Publication Data

US 2021/0382163 A1 Dec. 9, 2021

(51) Int. Cl.
*G01S 13/58* (2006.01)
*G01S 13/62* (2006.01)
*G01S 7/282* (2006.01)

(52) U.S. Cl.
CPC ............ *G01S 13/581* (2013.01); *G01S 7/282* (2013.01); *G01S 13/62* (2013.01)

(58) Field of Classification Search
CPC ......... G01S 13/62; G01S 7/282; G01S 13/581
See application file for complete search history.

(56) References Cited

U.S. PATENT DOCUMENTS

| 9,213,873 | B2 | 12/2015 | Austin |
| 9,441,939 | B2 | 9/2016 | Frederick |
| 9,470,777 | B2 | 10/2016 | Arage |
| 9,958,541 | B2* | 5/2018 | Kishigami ............ G01S 13/931 |
| 10,890,652 | B2* | 1/2021 | Kishigami ............ H01Q 21/06 |
| 2015/0309167 | A1* | 10/2015 | Shikatani ................ G01S 13/18 342/27 |
| 2019/0266366 | A1 | 8/2019 | Tuttle |

* cited by examiner

*Primary Examiner* — Bernarr E Gregory
*Assistant Examiner* — Yonghong Li
(74) *Attorney, Agent, or Firm* — Kowert, Hood, Munyon, Rankin & Goetzel, P.C.; Erik A. Heter; Dean M. Munyon

(57) ABSTRACT

The present disclosure is directed to motion detection and recognition using segmented data from reflections of transmitted signals. An apparatus includes a transmitter, a receiver, and a processor. The processor may cause the transmitter to transmit pulses of an RF signal, the reflections of which are received by a receiver. For each of a number of consecutive segments, the transmitter may transmit N pulses of the RF signal, followed by quiet period. The processor may determine amplitude and phase data for reflections received by the receiver. Over a number of consecutive segments, the processor may detect and classify the amplitude and phase data change over time.

20 Claims, 6 Drawing Sheets

MOTION DETECTION AND RECOGNITION USING SEGMENTED PHASE AND AMPLITUDE DATA FROM REFLECTED SIGNAL TRANSMISSIONS

BACKGROUND

Technical Field

This disclosure is directed to processing data from reflected signal transmissions, and more particularly, using data from reflected signal transmission to detect and classify motion.

Description of the Related Art

In recent years, radio frequency (RF) based sensing applications have been implemented on various types of consumer devices, such as smart phones, smart watches, tablet computers, and so on. Applications that utilize RF based sensing may include motion detection, collision avoidance, non-contact user interfacing, and so on.

To conduct RF sensing, a device may transmit pulses of RF signals and receive their reflections. Data from the reflections may then be processed to determine information regarding objects surrounding the device. For some applications, pulses may be continuously transmitted and reflections received, with data being continuously processed.

SUMMARY

The present disclosure is directed to motion detection and recognition using segmented data from reflections of transmitted signals. In one embodiment, an apparatus includes a transmitter, a receiver, and a processor. The processor may cause the transmitter to transmit pulses of an RF signal, the reflections of which are received by a receiver. For each of a number of consecutive segments, the transmitter may transmit N pulses of the RF signal, followed by quiet period. The processor may determine amplitude and phase data for reflections received by the receiver. Over a number of consecutive segments, the processor may detect a pattern of change (e.g., periodic change) to the amplitude and phase data.

In one embodiment, each segment may include the N pulses, each having a first duration, and a quiet time equivalent the M times the first duration. The values of M and N may both be integer values, with the value of M being larger than N. Reflections from the N pulses may be aggregated into a single data point for that particular segment. Changes to the amplitude and phase data from one segment to the next may be tracked, and over time, patterns of change (e.g., periodic change) may be detected. Based on detecting the patterns of change, motion of an object may be determined and classified.

BRIEF DESCRIPTION OF THE DRAWINGS

The following detailed description makes reference to the accompanying drawings, which are now briefly described.

Figure 1:
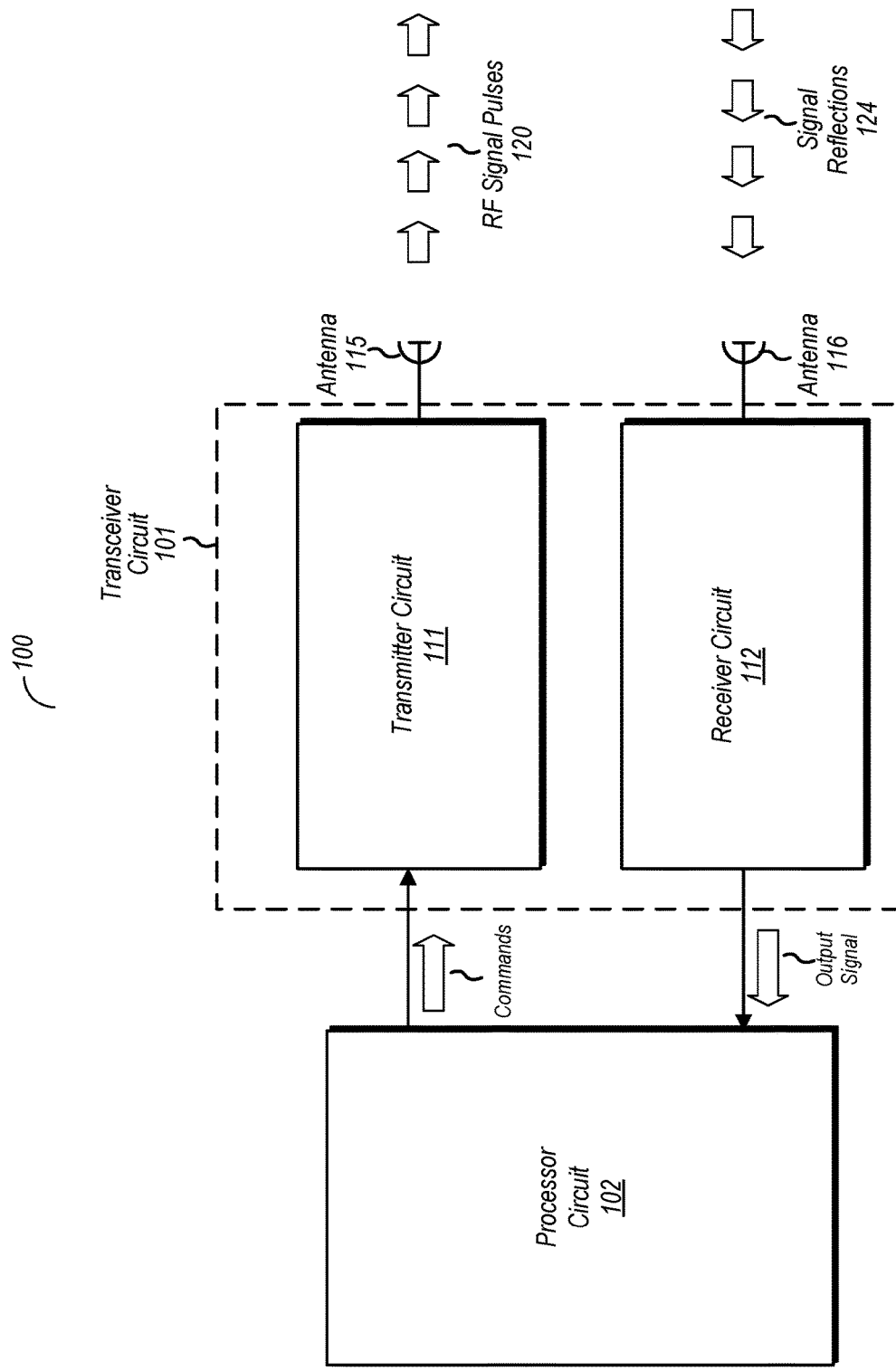
FIG. 1 is a block diagram of one embodiment of a device used for RF sensing.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it), Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to the detection of motion of an object using segmented phase and amplitude data. Many devices that are commonly available today, including smartphones, tablet computers, laptops, gaming consoles, and so on, are arranged to perform RF sensing applications. In performing such applications, the device may transmit RF signals. These RF signals may be reflected off of the ground and/or various objects in the vicinity of the device. The device may then process these reflections to obtain further data.

RF sensing applications may present significant challenges. Depending on the frequency of the RF signal used (which may be in part determined based on regulatory considerations), resolution of objects may be difficult, particularly at lower frequencies since frequency and available signal bandwidth are inversely related to one another. Angular resolution may be another challenge, which can require larger antennas or a larger number of antennae. Accordingly, bandwidth limitations may correspondingly limit the achievable range resolution for many applications. Backscattered reflections within a size of the resolution cell (minimum resolution) may thus be summed together and may thus be difficult to interpret.

For some motion tracking applications, continuous monitoring of a time-varying environment may be required to detect and characterize the motion. This may in turn require the processing of large volumes of data to characterize the dynamic environment in which the motion is taking place. This places an additional burden on the processing and memory resources available.

The present disclosure makes use of the knowledge that, for some applications, high resolution is not required. Additionally, the present disclosure makes use of the knowledge that many motion patterns of interest produce certain patterns of data over time. With this in mind, the amount of data necessary to detect and characterize such motion may be significantly less relative to applications requiring higher resolution and/or motion that does not produce periodic or other pattern-based changes to the collected data. In particular, detecting and characterizing motion may be performed in many cases based on fewer signal transmissions, and thus fewer reflections processed. Motion, such as walking, running, and so on may produce a periodicity to the data that reveals characteristics of the motion. This periodicity may be detected using significantly fewer transmissions, which may translate into a significant reduction of required processing resources. More generally, the present disclosure is directed to detecting patterns of motion, some of which (but not necessarily all) can be periodic. Pattern-based changes that are non-periodic may include, for example, an increasing amplitude of reflections of an object as the relative motion between the transmitting device and the object brings them closer to one another.

FIG. 1 is a block diagram of one embodiment of a device used for RF sensing. In the embodiment shown, device 100 includes a transceiver circuit 101 having a transmitter circuit 111 and a receiver circuit 112. Antennas 115 and 116 are coupled to transmitter circuit 111 and receiver circuit 112, respectively. Both transmitter circuit 111 and receiver circuit 112 are coupled to a processor circuit 102.

Transmitter circuit 111 in the embodiment shown may transmit pulses of a radio frequency (RF) signal, via antenna 115. Each of RF signal pulses 120 may have a first duration, $T_p$. As these pulses reflects off of various surfaces of the environment in which device 100 is operating, signal reflections 124 are receive by receiver circuit 112 via antenna 116. Transmitter circuit 111 may include any type of circuitry usable to generate the RF signal pulses, including various types of oscillators, phase locked loops, filters, and so on. Similarly, receiver 112 may include any type of circuitry suitable for receiving RF signals, and may also include phase locked loops, filters, analog-to-digital converters (ADCs) and so on.

Processor circuit 102 in the embodiment shown may send commands to transmitter circuit 111 to cause transmissions of RF pulses. Similarly, processor circuit 102 may receive output signals from receiver circuit 112, the output signals corresponding to signal reflections 124. Processor circuit 102 is in various embodiment arranged to cause the transmission of pulses in sequentially occurring segments. Each of these segments includes transmitting N pulses, followed by a quiet time. The quiet time may be equivalent in duration to M pulses, where N and M may both be integer values. As each pulse has a duration $T_p$, the amount of time in a given segment that pulses are transmitted is $N \times T_p$, followed by a quiet time of $M \times T_p$. Accordingly, each segment has a duration of $(M+N) \times T_p$. In various embodiments, the value of M is greater than N. For example, in one embodiment N=10 while M=90. Thus, since N+M=100 in this case, the duty cycle of pulse transmissions to quite time is 10%.

Having a quiet time that is large relative to the time that pulses are transmitted may result in a significant reduction of computing resources that are utilized to process the reflections into usable information. The quiet time may be carried out, in some embodiments, by inhibiting the transmission of pulses. In other embodiments, the quiet time may be carried out by inhibiting the reception of reflections. In either of these two cases, the quiet time may correspond to a time in which reflections of pulses are not processed Receiver circuit 112 in the illustrated embodiment provides output signals to processor circuit 102 based on the received signal reflections 124. Processor circuit 102 determines amplitude and phase data for each segment based on the reflections, and may further detect patterns of (e.g., periodic) change in the amplitude and phase data over a plurality of consecutive segments. Based on the patterns of changes to the data, processor circuit 102 may determine that device 100 is in motion, and may further classify the type of motion. In embodiments in which device 100 is stationary, the patterns of change observed may be used to detect, for example, hand gestures or some other type of motion of a person or object within the vicinity of the device.

In various embodiment, processor circuit 102 may aggregate data from reflections for the N pulses of a given segment, as received by receiver circuit 112, into a single data point. Accordingly, data for a number of consecutive segments may be characterized by a corresponding number of single data points. As previously noted, processor circuit 102 may extract and process amplitude and phase data from the received reflections. In aggregating the data from the received reflections, processor circuit 102 in various embodiments may calculate an average amplitude value of reflections received in each segment. With respect to the phase data, processor circuit 102 in the embodiment shown is configured to calculate a slope of phase change between consecutive segments. Moreover, processor 102 may also extrapolate a phase change between a current segment and subsequent next (future) segment prior to transmission of N pulses for the next segment, wherein the current segment and the next segment are consecutive segments.

Processor circuit 102 may also perform phase corrections to reflections of the transmitted pulses. In one embodiment, for each of the N pulses, the processor circuit 102 may correct the phase for reflections of each of the N pulses in a given segment by a factor of $2\pi$. More generally, for each pulse within a segment, the phase may be corrected by adding or reducing the phase to prevent phase jumps larger than that relative to the immediately preceding pulse. This may also include reducing the phase value of the first pulse of each of the N pulses for a given segment. This process may be referred to as phase unwrapping.

Figure 2:
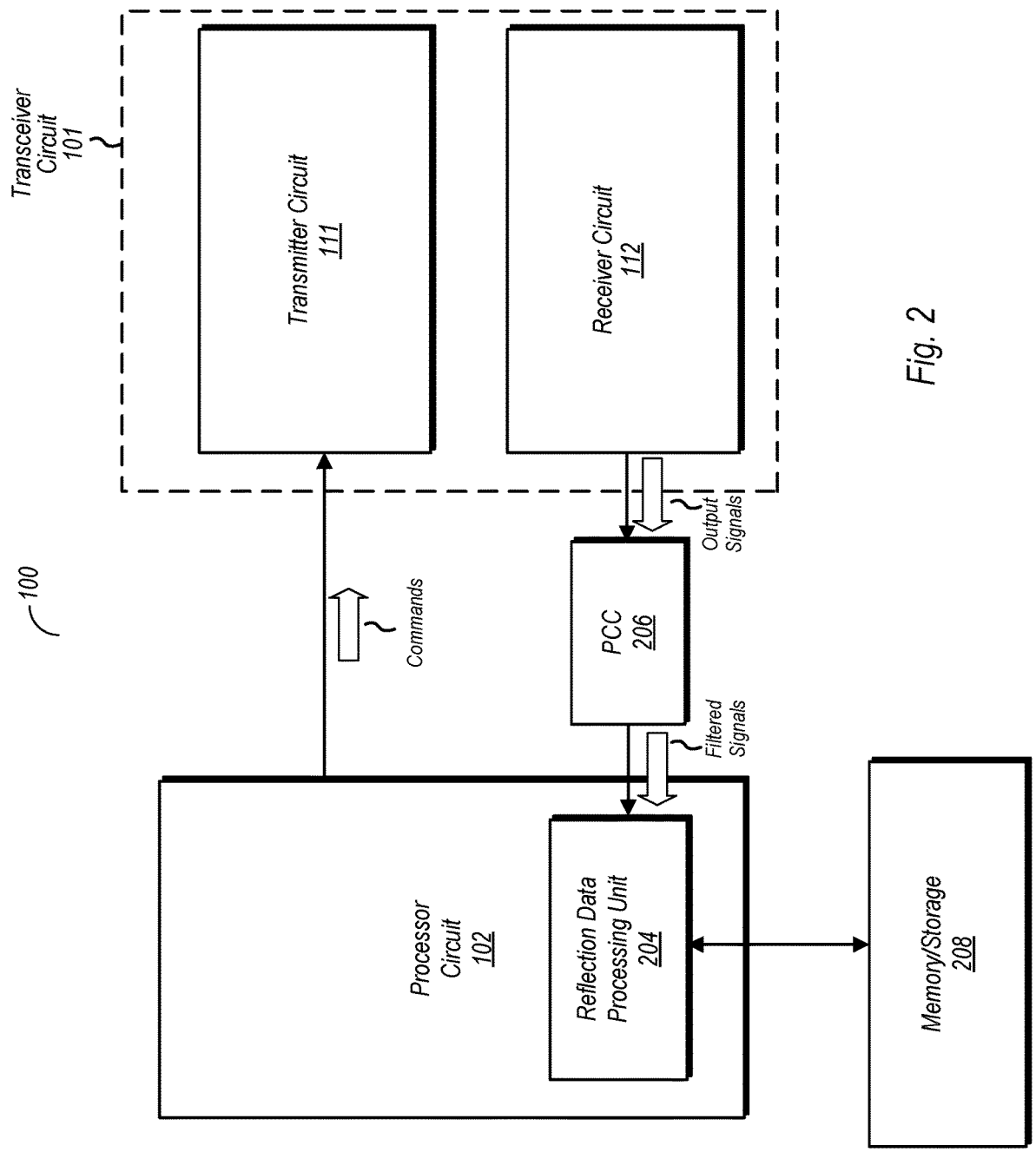
FIG. 2 is a block diagram further illustrating a mobile device used for RF sensing.

FIG. 2 is a block diagram further illustrating a device used for RF sensing. In one embodiment, the device of FIG. 2 is a mobile device, e.g., a smartphone. It is noted that the arrangement shown in FIG. 2 may also apply to devices that are not considered to be mobile devices, such as gaming consoles, desktop computers, and so on. In the embodiment shown, device 100 includes the components shown in FIG. 1. In addition, device 100 in the embodiment shown includes a pulse compression circuit (PCC) 206 coupled between receiver circuit 112 and processor circuit 102. In practice, PCC 206 may be implemented within receiver circuit 112 or within processor circuit 102, and may include any suitable combination of hardware/circuitry, software, and/or firmware. More generally, any suitable pulse compression circuit/mechanism may be used to implement PCC 206. In one embodiment, PCC 206 is implemented as a matched filter, although this example is not intended to be limiting. The PCC 206 may achieve pulse compression over the corresponding range dimension, and may cross-correlate reflection with a transmitted RF signal.

During operation, PCC 206 may perform an operation in which received reflections are cross-correlated with a copy of the transmitted signal. The cross-correlated signal output by PCC 206 is a sum of time-delayed impulse responses of the transmitted waveform that make up each of the N pulses, with an amplitude and Doppler shift matching the distance, radar cross section, and velocity of the various objects in the environment from which the transmitted pulses are reflected/scattered. The received signals may be very complex (depending on, e.g., the nature of the environment and dynamics thereof). However, since the present disclosure is not focused on obtaining a high resolution picture of the surrounding environment, processor circuit 102, in one embodiment, only tracks over time (e.g., between received pulses) the amplitude and complex phase over a specified range interval.

In the illustrated embodiment, processor circuit 102 is coupled to a memory/storage 208. This memory/storage 208 may represent one or more different components that provide persistent storage of data and instructions, and these components may be of different types. Accordingly, memory/storage 208 may include various types of random access memory (RAM), flash memory, read-only memory (ROM), and so on.

Processor circuit 102 in the embodiment shown also includes a reflection data processing unit 204. This unit may be implemented using any suitable combination of hardware/circuitry, software, and/or firmware. Reflection data processing unit 204 may perform various processing functions on the received reflection data. This may include determining amplitude of received reflections, averaging the amplitudes, determining phase data, calculating a slope of the phase, extrapolation of a predicted phase/slope for future reflections, detecting periodicity in the data, detecting and classifying motion based on the periodicity and/or other characteristics, and so on. More generally, reflection data processing unit 204 may detect patterns in the motion, which can include (but is not limited to) periodic motion.

Figure 3:
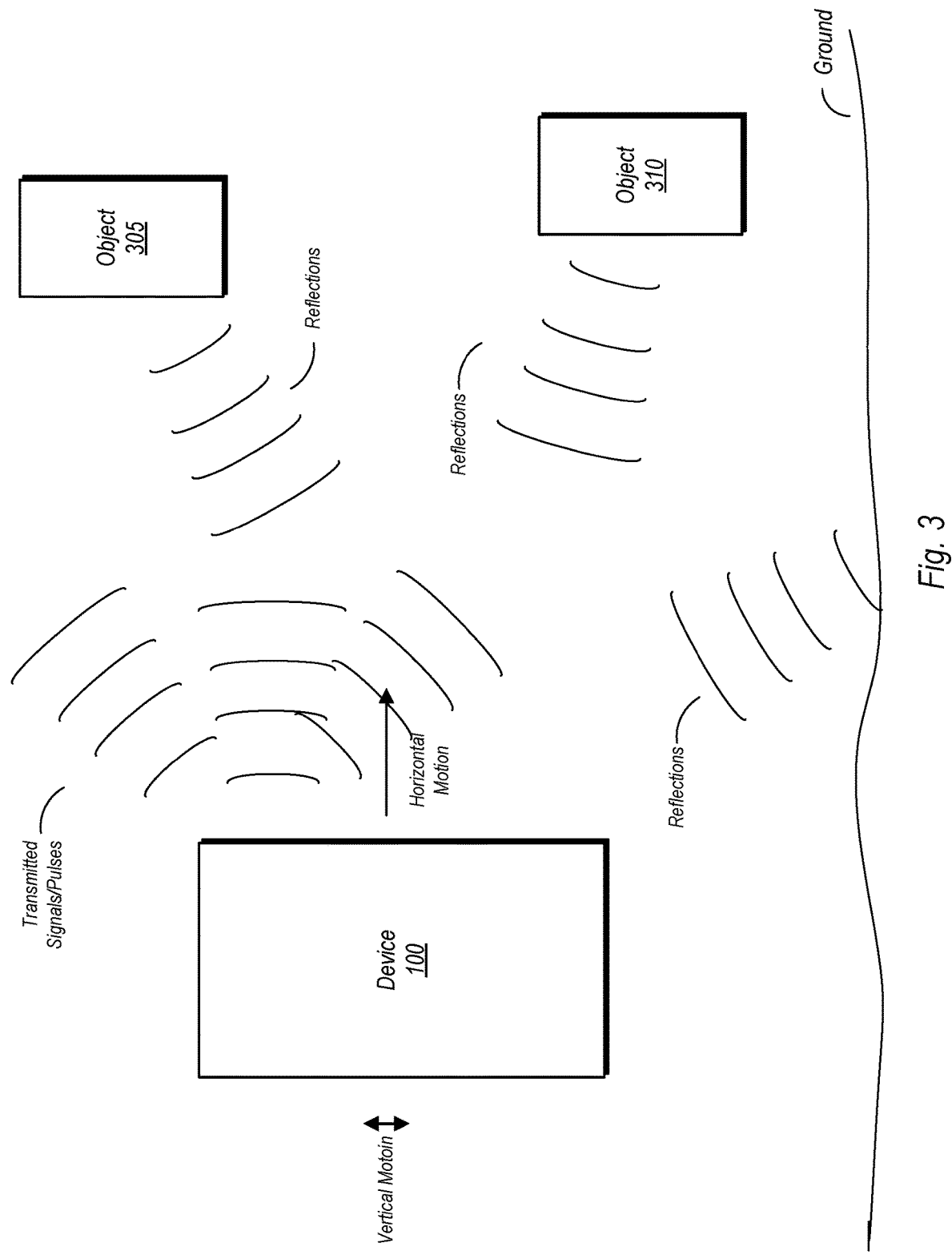
FIG. 3 is a diagram illustrating operation of one embodiment of a mobile device utilizing RF sensing.

FIG. 3 is a diagram illustrating operation of one embodiment of a mobile device utilizing RF sensing. In the embodiment shown, device 100 is a mobile device that is operating in the illustrated environment, transmitting pulses of RF signals and receiving reflections of the same. Objects 305, 310, and the ground are sources of the reflections in this particular example. Device 100 is also in motion in this particular example. The motion depicted here may correspond to, e.g., a mobile device in the pocket of a user that is walking or running, with a limited range of vertical motion as indicated, as well as horizontal motion in the direction shown. Objects 305 and 310 as shown here are examples, while in a real life environment, these objects may represent virtually anything with a surface that reflects RF signals. It is noted that the example presented herein, using a mobile device, is not intended to limit the disclosure to mobile devices or detection of a particular type of motion. In contrast, the disclosure is intended to cover embodiments that implemented in devices not considered to be mobile devices (e.g., gaming consoles, desktop computers, etc.), and may include motion that is periodic, but may also (or alternatively) include motion that is not periodic but nevertheless exhibits a detectable pattern.

In applications such as pulsed radar type applications as disclosed herein, a received signal for each pulse may comprise a sum of time-delayed and Doppler shifted back scattered radiation. Accordingly, the received signal by mobile device 301 in the illustrated example may be the sum of those reflections from objects 305, 310, and the ground. A time-delay for each reflection is determined by the radial distance from mobile device 100 to the reflecting surface. The Doppler frequency shift of each reflection is determined by the relative radial velocity between the reflecting surface and device 100. The amplitude of the received reflections is determined by the distance of device 100 to the reflecting surface, as well as various characteristics of that surface (size, shape, composition, etc.). For objects that are within a distance from device 100 that is smaller than the resolution cell size cannot be resolved, and thus their reflections are summed together. However, as noted above, since detecting motion based on pattern-based (e.g., periodic) change of the amplitude and phase data does not require high resolution, the summing of these reflections does not adversely affect the ability to detect motion. Furthermore the detection of motion can be performed with significantly less processing power based on the segmented operation previously described.

Figure 4:
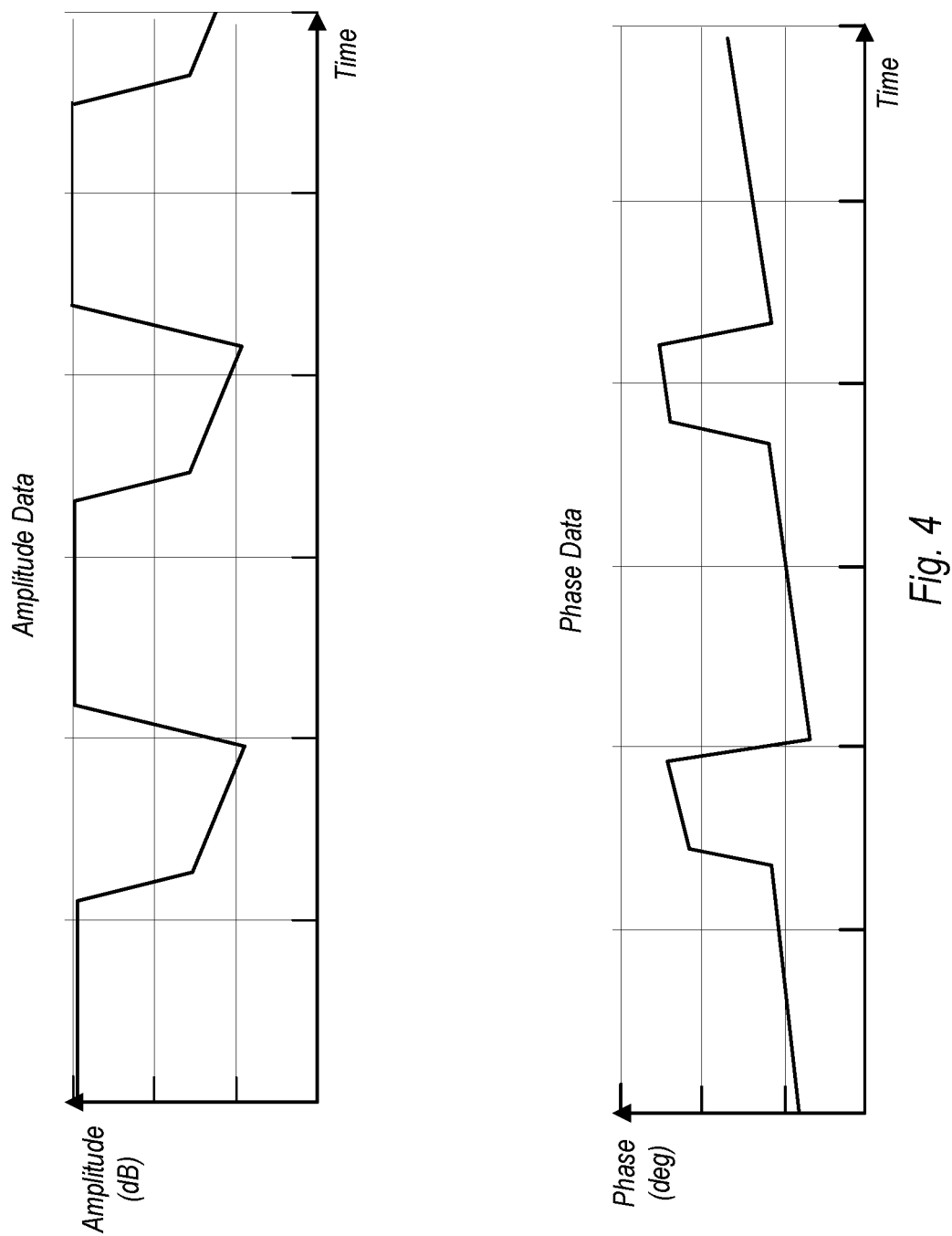
FIG. 4 is a graphic example illustrating the detection of a pattern of change of amplitude and phase data from consecutive segments over time, where the patterns of change are periodic.

FIG. 4 is a graphic example illustrating the detection of periodic change of amplitude and phase data from consecutive segments over time. It is noted that these graphs are provided for illustrative purposes, but are not intended to limit the actual periodic data that may be detected by a given embodiment of the disclosure as discussed above. Furthermore, it is noted that the disclosure is not limited to detecting periodic change, but is instead intended to cover embodiments that can detect patterns of motion, whether periodic or not. Accordingly, the example presented in FIG. 4 is provided to illustrate one possible example of pattern-based motion, which in this case, includes periodic changes to the observed data.

As can be seen in FIG. 4, both the amplitude and phase data have a pattern that generally repeats over time. Various embodiments as discussed above in FIGS. 1-3 may detect patterns that are periodic, such as those shown here. Such periodic data may correspond to certain types of motion that can include (but is not limited to) walking, running, jogging, pedaling a bicycle, and so on. Based on the periodicity and characteristics of the pattern, a processor in accordance with the disclosure may be able to detect the motion and may be further able classify the type of motion.

As noted above, the transmission of pulses and receiving of reflections may be performed in segments. The frequency at which these segments occurs may be based on an anticipated periodicity for the various types of motion to be detected. Generally speaking, the frequency at which segments occur may be at least the Nyquist frequency of the periodicity of the motion to be detected, or more particularly, at least twice the characteristic frequency of the periodic (or otherwise pattern-based) motion. While oversampling may be performed, the various method and apparatus embodiments disclosed herein may control the sampling (segment) rate to limit the processing/memory resource consumption to a desired value.

Figure 5:
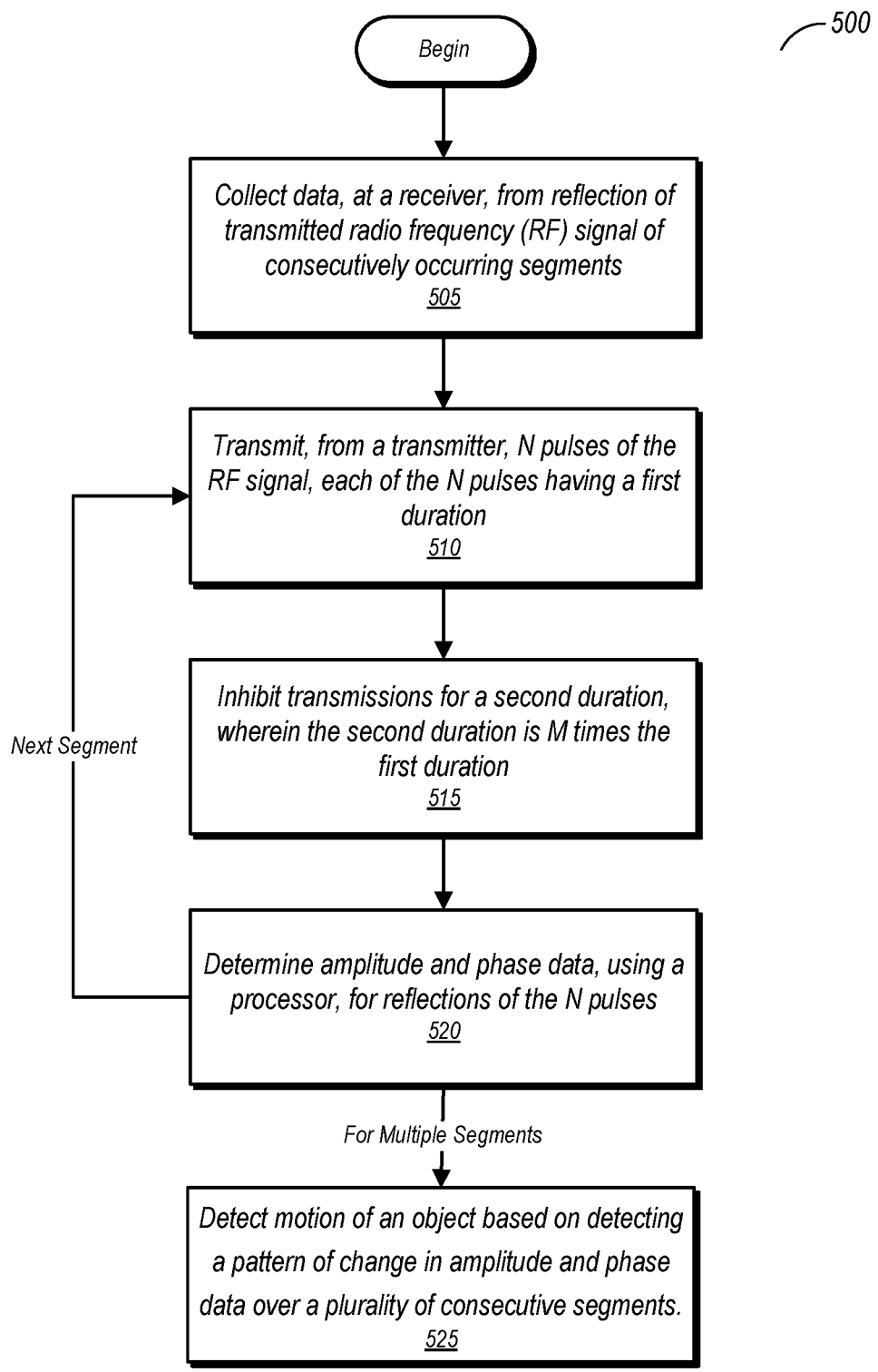
FIG. 5 is a flow diagram illustrating one embodiment of a method for detecting motion using a mobile device.

FIG. 5 is a flow diagram illustrating one embodiment of a method for detecting motion using a mobile device. Method 500 may be performed by any of the various embodiments of a device discussed above, which may include mobile devices as well as devices that are stationary during operation. Apparatus embodiments capable of carrying out Method 500, but not explicitly discussed herein, may also fall within the scope of this disclosure.

Method 500 comprises collecting data, at a receiver, from reflections of radio frequency (RF) signals transmitted in consecutively occurring segments (block 505), Collecting data in a particular one of the segments comprises transmitting, from a transmitter, N pulses of the RF signal, each of the N pulses having a first duration (block 510). Collecting data in the particular one of the segments further includes inhibiting processing of reflections for a second duration, wherein the second duration is M times the first duration (block 515). The inhibiting of processing reflections may include inhibiting reception of reflections (irrespective of whether transmissions are still occurring) and/or inhibiting transmissions. Thereafter, collecting data in the particular one of the segments includes determining amplitude and phase data, using a processor, for reflections of the N pulses (block 520). The method may return from block 520 back to block 510 in a repeating pattern for consecutive segments. Method 500 further includes detecting motion of an object based on detecting pattern-based (e.g., periodic) change in amplitude and phase data over a plurality of consecutive segments (block 525).

In various embodiments, the object is a mobile device comprising the transmitter and the receiver. Accordingly, the motion detected may be that of the object itself. For example, Method 500 may be carried out by a smart phone in the pocket of a user that is walking. However, Method 500 may also apply to devices that are stationary (e.g., desktop computers, gaming consoles, etc.).

In various embodiments, M>N. Since the second duration is M times the length of first duration (which is the duration of each of the N pulses), the amount of time in which processing the reflection of pulses is inhibited within a segment exceeds the amount of reflections are processed. In example embodiment, a segment may be 100 times the first duration, with N=10 and M=90. Since the processing time is dependent on the number and duration of pulses within a given segment, such an embodiment may significantly reduce the processing power consumption and resources required to process data obtained from the various reflections of the N pulses relative to embodiments where pulses are continuously transmitted and reflections are continuously received in an effort to obtain continuous data collection and motion tracking for motion detection and classification. Therefore, limiting the number of reflections to be processed, either by limiting the number of reflections received or, alternatively, by limiting the number of pulses transmitted may result in a significant reduction of processing workload.

Various embodiments of method 500 includes the processor calculating a slope of phase change between consecutive segments. Embodiments may also include the processor extrapolating a phase change between a present segment and a next segment prior to transmission of N pulses for the next segment. Some embodiments include the processor determining an average amplitude for N pulses of a given segment, and may also include the processor classifying the motion based on characteristics of the patterns of change (which can be, but are not necessarily, periodic).

Figure 6:
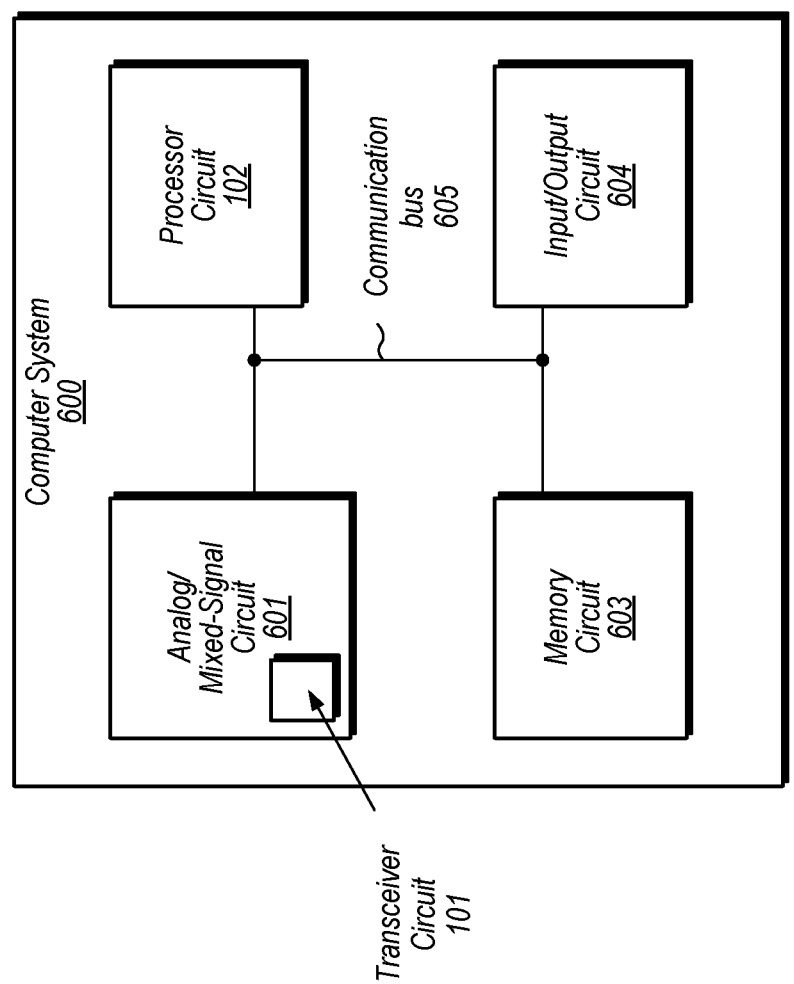
FIG. 6 a block diagram of one embodiment of an example system.

A block diagram of computer system is illustrated in FIG. 6. Computer system 600 in the embodiment shown may generally conform to any of the devices discussed herein, including mobile devices such as smart phones, tablet computers, and so on. Other types of computer systems not explicitly discussed herein, but arranged in a like manner to computer system 600 may also fall within the scope of this disclosure. Such computer systems may include desktop computers, gaming consoles, and other devices that may be stationary during operation, in addition to the previously mentioned mobile devices.

In the illustrated embodiment, the computer system 600 includes analog/mixed-signal circuits 601, processor circuit 602, memory circuit 603, and input/output circuits 604, each of which is coupled to communication bus 605. In various embodiments, computer system 600 may be a system-on-a-chip (SoC) and be configured for use in a desktop computer, server, or in a mobile computing application such as, a tablet, laptop computer, or wearable computing device. However, embodiments are also possible and contemplated in which the implementation of components of computer system 600 are distributed among two or more integrated circuits.

Analog/mixed-signal circuits 601 includes a variety of circuits. Among these circuits is an embodiment of a transceiver circuit 101 as previously discussed. This transceiver circuit 101 may transmit pulses of an RF signal and receive reflections thereof, as described in reference to FIGS. 1-5 herein. Analog/mixed-signal circuits 601 may also include a crystal oscillator circuit, a phase-locked loop (PLL) circuit, an analog-to-digital converter (ADC) circuit, and a digital-to-analog converter (DAC) circuit (all not shown). In various embodiments, analog/mixed-signal circuits 601 may also be configured to perform power management tasks with the inclusion of on-chip power supplies and voltage regulators.

Processor circuit 602 may, in various embodiments, be representative of a processor that performs computational operations. For example, processor circuit 602 may be a central processing unit (CPU) such as a microprocessor, a microcontroller, an application-specific integrated circuit (ASIC), or a field-programmable gate array (FPGA). Processor 602 may also implement the processing of received reflections, as discussed herein, using software instructions, firmware, and/or dedicated circuitry.

Memory circuit 603 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that in the embodiment of a computer system in 600, a single memory circuit is depicted. In other embodiments, any suitable number of memory circuits may be employed, and these circuits may be of different types (e.g., one memory RAM, another memory being flash storage, and yet another memory being some other non-volatile storage).

Input/output circuits 604 may be configured to coordinate data transfer between computer system 600 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1004 may be configured to implement a version of Universal Serial Bus (USB) protocol or IEEE 1394 (Firewire®) protocol.

Input/output circuits 604 may also be configured to coordinate data transfer between computer system 600 and one or more devices (e.g., other computing systems or integrated circuits) coupled to computer system 600 via a network. In one embodiment, input/output circuits 604 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 604 may be configured to implement multiple discrete network interface ports.

Numerous variations and modifications will become apparent to those skilled in the art once the above disclosure is fully appreciated. It is intended that the following claims be interpreted to embrace all such variations and modifications.

What is claimed is:

1. An apparatus, comprising:
 a transmitter configured to transmit pulses of a radio frequency (RF) signal, wherein ones of the pulses have a first duration;
 a receiver configured to receive reflections of transmitted pulses;
 a pulse compression circuit configured to cross correlate the reflections with the RF signal, wherein the pulse compression circuit comprises a matched filter; and
 a processor configured to:
  cause the transmitter to transmit pulses in sequentially occurring segments, wherein ones of the segments comprise transmitting N pulses during a first portion of a given segment that is N times the first duration, followed by inhibiting processing of reflections during a second portion of the given segment that occurs subsequent to the first portion, the second portion having a second duration that is M times the first duration;
  determine, during the first portion, amplitude and phase data for the given segment based on the reflections of the N pulses; and
  detect a pattern of change in the amplitude and phase data over a plurality of consecutive segments.

2. The apparatus of claim 1, wherein M>N.

3. The apparatus of claim 1, wherein the processor is configured to aggregate reflections for ones of the N pulses of the given segment into a single data point.

4. The apparatus of claim 1, wherein the processor is further configured to calculate a slope of phase change between a phase of a first segment and a phase of a second segment following the first segment, wherein the first and second segments are consecutive segments.

5. The apparatus of claim 1, wherein the processor is configured to calculate, for ones of the N pulses of a given segment, an average amplitude value.

6. The apparatus of claim 1, wherein the processor is configured to extrapolate a phase change between a current segment and subsequent next segment prior to transmission of N pulses for the next segment, wherein the current segment and the next segment are consecutive segments.

7. The apparatus of claim 1, wherein the processor is configured to correct a phase of reflections of the N pulses of a given segment by a factor of $2\pi$.

8. The apparatus of claim 1, wherein the processor is configured to determine that an object is in motion based on detecting the pattern of change.

9. The apparatus of claim 8, wherein the processor is configured to classify the motion based on characteristics of the pattern of change.

10. A method comprising:
 collecting data, at a receiver, from reflections of radio frequency (RF) signals transmitted in consecutively occurring segments, wherein collecting data in a particular one of the segments comprises:
  transmitting, from a transmitter and during a first portion of the particular one of the segments, N pulses of the RF signal, wherein ones of the N pulses have a first duration, wherein a duration of the first portion is N times the first duration;

determining amplitude and phase data, using a processor, for reflections of the N pulses during the first portion; and inhibiting processing of reflections during a second portion of the particular segment, the second portion having a second duration that is M times the first duration; and detecting motion of an object based on detecting a pattern of change in amplitude and phase data over a plurality of consecutive segments.

11. The method of claim 10, wherein the object is a mobile device comprising the transmitter and the receiver.

12. The method of claim 10, wherein M>N.

13. The method of claim 10, further comprising the processor calculating a slope of phase change between consecutive segments.

14. The method of claim 10, further comprising the processor extrapolating a phase change between a present segment and a next segment prior to transmission of N pulses for the next segment.

15. The method of claim 10, further comprising the processor determining an average amplitude for N pulses of a given segment.

16. The method of claim 10, further comprising the processor classifying the motion as periodic motion based on detecting periodic changes in the pattern of amplitude and phase data.

17. The method of claim 10, further comprising cross-correlating received reflections with the RF signals using a matched filter.

18. A mobile device comprising:
a transmitter configured to transmit pulses of a radio frequency (RF) signal;
a receiver configured to detect reflections of the pulses of the transmitted RF signal; and
a processor configured to detect that the mobile devices is in motion, wherein detecting that the mobile device is in motion comprises:
the processor causing the transmitter to transmit pulses of the RF signal in consecutively occurring segments, wherein a given segment comprises transmitting N pulses of the RF signal during a first portion of the given segment, wherein ones of the N pulses have a first duration, and wherein the first portion has a duration of N times the first duration;
determining, during the first portion, amplitude and phase data the reflections received, by the receiver, of the N pulses of the RF signal;
inhibiting processing of reflections during a second portion of the given segment, wherein the second portion has a duration that is M times the first duration, wherein M>N;
detecting, over a plurality of consecutive segments, a pattern of change in the amplitude and phase data; and
determining that the mobile device is in motion responsive to detecting the pattern of change in the amplitude and phase data.

19. The mobile device of claim 18, wherein the processor is further configured to:
calculate a slope of phase change between a phase of a first segment and a phase of a second segment following the first segment, wherein the first and second segments are consecutive segments; and
extrapolate a phase change between a current segment and subsequent next segment prior to transmission of N pulses for the next segment, wherein the current segment and the next segment are consecutive segments.

20. The mobile device of claim 18, wherein the processor is further configured to:
aggregate reflections for the N pulses of a given segment into a single data point; and
calculate, for the N pulses of the given segment, an average amplitude value.

* * * * *